(12) United States Patent
Carlson et al.

(10) Patent No.: US 6,429,236 B1
(45) Date of Patent: Aug. 6, 2002

(54) ACRYLIC-MODIFIED PHENOLIC-URETHANE FOUNDRY BINDERS

(75) Inventors: Gary M. Carlson, Dublin; Robert B. Fechter, Worthington; Edward G. Toplikar, Hilliard; D. Greg Hendershot, Columbus, all of OH (US)

(73) Assignee: Ashland Inc., Covington, KY (US)

( * ) Notice: Subject to any disclaimer, the term of this patent is extended or adjusted under 35 U.S.C. 154(b) by 0 days.

(21) Appl. No.: 09/576,510

(22) Filed: May 23, 2000

(51) Int. Cl.[7] .................................................. B22C 1/22
(52) U.S. Cl. ....................................... 523/146; 523/145
(58) Field of Search ............................... 523/139, 142, 523/143, 145, 146

(56) References Cited

U.S. PATENT DOCUMENTS

| 3,676,392 A | 7/1972 | Robins | 260/38 |
| 4,526,219 A | 7/1985 | Dunnavant et al. | 164/16 |
| 4,974,659 A | * 12/1990 | Shriver et al. | 164/16 |
| 5,101,001 A | * 3/1992 | Henry et al. | 528/139 |
| 5,169,910 A | 12/1992 | Corley | 525/481 |
| 5,596,021 A | 1/1997 | Adembri et al. | 521/99 |
| 5,880,175 A | 3/1999 | Archibald et al. | 523/142 |
| 6,037,389 A | 3/2000 | Archibald et al. | 523/142 |

FOREIGN PATENT DOCUMENTS

GB          2066714 A   *  7/1981

* cited by examiner

Primary Examiner—Edward J. Cain
Assistant Examiner—Katarzyna W. Lee
(74) Attorney, Agent, or Firm—David L. Hedden

(57) ABSTRACT

The subject invention relates to a foundry binder system that cures in the presence of a volatile amine curing catalyst. The binder system comprises a Part I component comprising (1) a phenolic resin component, and (2) a free radical initiator, and a Part II component comprising (1) a polyisocyanate, and (2) a multifunctional acrylate. The foundry binders are used for making foundry mixes. The foundry mixes are used to make foundry shapes that are used to make metal castings.

10 Claims, No Drawings

ACRYLIC-MODIFIED PHENOLIC-URETHANE FOUNDRY BINDERS

FIELD OF THE INVENTION

The subject invention relates to a foundry binder system that cures in the presence of a volatile amine curing catalyst. The binder system comprises a Part I component comprising (1) a phenolic resin component, and (2) a free radical initiator, and a Part II component comprising (1) a polyisocyanate, and (2) a multifunctional acrylate. The foundry binders are used for making foundry mixes. The foundry mixes are used to make foundry shapes that are used to make metal castings.

BACKGROUND OF THE INVENTION

In the foundry industry, one of the procedures used for making metal parts is "sand casting". In sand casting, disposable foundry shapes, e.g. molds and cores, are fabricated with a mixture of sand and an organic or inorganic binder. The foundry shapes are arranged to form a molding assembly, which results in a cavity through which molten metal will be poured. After the molten metal is poured into the assembly of foundry shapes, the metal part formed by the process is removed from the molding assembly. The binder is needed so the foundry shapes do not disintegrate when they come into contact with the molten metal. In order to obtain the desired properties for the binder, various solvents and additives are typically used with the reactive components of the binders to enhance the properties needed.

Two of the prominent fabrication processes used in sand casting are the no-bake and the cold-box processes. In the no-bake process, a liquid curing catalyst is mixed with an aggregate and binder to form a foundry mix before shaping the mixture in a pattern. The foundry mix is shaped by compacting it in a pattern, and allowing it to cure until it is self-supporting. In the cold-box process, a volatile curing catalyst is passed through a shaped mixture (usually in a corebox) of the aggregate and binder to form a cured foundry shape.

There are many requirements for a binder system to work effectively. For instance, the binder must have a low viscosity, be gel-free, and remain stable under use conditions. In order to obtain high productivity in the manufacturing of foundry shapes, binders are needed that cure efficiently, so the foundry shapes become self-supporting and handleable as soon as possible.

With respect to no-bake binders, the binder must produce a foundry mix with adequate worktime and striptime to allow for the fabrication of larger cores and molds. On the other hand, cold-box binders must produce foundry mixes that have adequate benchlife, shakeout, and nearly instantaneous cure rates. The foundry shapes made with the foundry mixes using either no-bake or cold-box binders must have adequate tensile strengths (particularly immediate tensile strengths), scratch hardness, and show resistance to humidity.

One of the greatest challenges facing the formulator is to formulate a binder that will hold the foundry shape together after is made so it can be handled and will not disintegrate during the casting process[1], yet will shakeout from the pattern after the hot, poured metal cools. Without this property, time consuming and labor intensive means must be utilized to break down the binder so the metal part can be removed from the casting assembly. This is particularly a problem with internal cores, which are imbedded in the casting assembly and not easily removed. Another related property required for an effective foundry binder is that foundry shapes made with the binder must release readily from the pattern.

Casting temperatures of poured metal reach 1500° C. for iron and 700° for aluminum parts.

The flowability of a foundry mix made from sand and an organic binder can pose greater problems with respect to cold-box applications. This is because, in some cases, the components of the binder, particularly the components of phenolic urethane binders, may prematurely react after mixing with sand, while they are waiting to be used. If this premature reaction occurs, it will reduce the flowability of the foundry mix and the molds and cores made from the binder will have reduced tensile strengths. This reduced flowability and decrease in strength with time indicates that the "benchlife" of the foundry mix is inadequate. If a binder results in a foundry mix without adequate benchlife, the binder is of limited commercial value.

In view of all these requirements for a commercially successful foundry binder, the pace of development in foundry binder technology is gradual. It is not easy to develop a binder that will satisfy all of the requirements of interest in a cost-effective way. Also, because of environmental concerns and the cost of raw materials, demands on the binder system may change. Moreover, an improvement in a binder may have some drawback associated with it. In view of these requirements, the foundry industry is continuously searching for new binder systems that will better meet them.

One of the most successful binders used in the cold-box process for making foundry shapes is the phenolic-urethane binder. The phenolic-urethane binder comprises a phenolic resin component and a polyisocyanate component that are mixed with an aggregate to form a foundry mix. The foundry mix is blown into pattern, typically a corebox, where it is cured by passing a volatile tertiary amine catalyst through it to form a cured foundry shape. Phenolic-urethane binders are widely used in the foundry industry to bond the sand cores and molds used in casting iron and aluminum. An example of a commonly used phenolic-urethane binder used in the cold-box process is disclosed in U.S. Pat. No. 3,409,575, which is hereby incorporated by reference.

Another commercially successful cold-box binder uses a two-part system, which involves a hydroperoxide as one part and an acrylate blend as the second. The two parts are mixed on the sand, blown into the tooling, and cured using sulfur dioxide. This technology is described in U.S. Pat. No. 4,526,219.

Each binder system offers a set of advantages and disadvantages. The phenolic urethane offer good hot strength, good erosion resistance, rapid cure, but the foundry mix made with the binder has a short benchlife and castings made from the foundry mixes show poor resistance to veining. The acrylate-based system offers excellent veining resistance and almost unlimited benchlife, but suffers from poor erosion resistance.

Recently a system has been developed which is disclosed in U.S. Pat. No. 5,880,175, which is hereby incorporated by reference, and incorporates aspects of these two prior systems. This binder also uses two parts. The first part is an epoxy/hydroperoxide solution and the second part is a blend of multifunctional acrylates and a polyisocyanate. The two parts of the binder are mixed on the sand and blown into the tooling and cured using an amine gas. This system offers excellent veining resistance and good benchlife, but suffers from poor erosion resistance.

SUMMARY OF THE INVENTION

The invention relates to a foundry binder system, which will cure in the presence of a volatile amine curing catalyst comprising:

A. a Part I component comprising
   (1) a phenolic resin component; and
   (2) a free radical initiator,
B. a Part II component comprising:
   (1) from 5 to 70 weight percent of a reactive unsaturated acrylic monomer, acrylic polymer, and mixtures thereof; and
   (2) from 10 to 70 weight percent of an organic polyisocyanate.

The binder may also contain an epoxy component, which is usually part of the Part I component in an amount of from 1 to 40 weight percent.

The foundry binders are used for making foundry mixes. The foundry mixes are used to make foundry shapes, which are used to make metal castings. Foundry shapes made with the binder systems have higher immediate tensile strengths than foundry shapes prepared with comparable binders shown in U.S. Pat. No. 5,880,175. This improvement is commercially significant in terms of handling the foundry shapes after they are made. Because the tensile strength of the core builds up faster, a foundry can use less binder and catalyst than used in the binder systems shown in U.S. Pat. No. 5,880,175 without sacrificing tensile strengths. Foundry shapes, made with binders, are resistant to sagging even after storage, which is important in producing castings that are dimensionally accurate. Castings made with the foundry shapes show fewer veining defects.

The results were particularly surprising because it is known that phenolic groups are often used as free radical inhibitors, yet there is no apparent cure inhibition of the subject binder, even in the presence of air, which is often used to activate phenolic inhibitors.

BEST MODE AND OTHER MODES OF PRACTICING THE INVENTION

The phenolic resin component comprises a phenolic resole resin, a free radical initiator, and typically a solvent. It may also contain various optional ingredients such as adhesion promoters and release agents.

The phenolic resin used must be liquid or organic solvent-soluble. The phenolic resin component of the binder composition is generally employed as a solution in an organic solvent. The amount of solvent used should be sufficient to result in a binder composition permitting uniform coating thereof on the aggregate and uniform reaction of the mixture. The specific solvent concentration for the phenolic resins will vary depending on the type of phenolic resins employed and its molecular weight. In general, the solvent concentration will be in the range of up to 80% by weight of the resin solution, preferably in the range of 20% to 80%.

The phenolic resole resin reacts with the polyisocyanate in the presence of the amine curing catalyst to form urethane linkages. The term "phenolic resole resin" does not include phenolic novalac resins. The phenolic resole resin is preferably prepared by reacting an excess of aldehyde with a phenol in the presence of either an alkaline catalyst or a metal catalyst. The phenolic resins are preferably substantially free of water and are organic solvent soluble. The preferred phenolic resins used in the subject binder compositions are well known in the art, and are specifically described in U.S. Pat. No. 3,485,797, which is hereby incorporated by reference. These resins, known as benzylic ether phenolic resole resins, are the reaction products of an aldehyde with a phenol. They contain a preponderance of bridges joining the phenolic nuclei of the polymer, which are ortho-ortho benzylic ether bridges. They are prepared by reacting an aldehyde and a phenol in a mole ratio of aldehyde to phenol of at least 1:1 in the presence of a metal ion catalyst, preferably a divalent metal ion such as zinc, lead, manganese, copper, tin, magnesium, cobalt, calcium, and barium.

The phenols used to prepare the phenolic resole resins include any one or more of the phenols which have heretofore been employed in the formation of phenolic resins and which are not substituted at either the two ortho-positions or at one ortho-position and the para-position. Such unsubstituted positions are necessary for the polymerization reaction. Any one, all, or none of the remaining carbon atoms of the phenol ring can be substituted. The nature of the substituent can vary widely and it is only necessary that the substituent not interfere in the polymerization of the aldehyde with the phenol at the ortho-position and/or para-position. Substituted phenols employed in the formation of the phenolic resins include alkyl-substituted phenols, aryl-substituted phenols, cyclo-alkyl-substituted phenols, aryloxy-substituted phenols, and halogen-substituted phenols, the foregoing substituents containing from 1 to 26 carbon atoms and preferably from 1 to 12 carbon atoms.

Specific examples of suitable phenols include phenol, 2,6-xylenol, o-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Multiple ring phenols such as bisphenol A are also suitable.

The aldehyde used to react with the phenol has the formula RCHO wherein R is a hydrogen or hydrocarbon radical of 1 to 8 carbon atoms. The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula RCHO wherein R is hydrogen or a hydrocarbon radical of 1 to 8 carbon atoms. The most preferred aldehyde is formaldehyde. It is preferred to package and use the binders system as a two-part system.

Although not necessarily preferred, the Part I component, may contain a solvent, such as an aromatic hydrocarbon solvent such as benzene, toluene, xylene, ethylbenzene, naphthalenes, or an ester solvent, such as rapeseed methyl ester, or mixtures thereof, and the like. If a solvent is used, sufficient solvent should be used so that the resulting viscosity of the Part I is less than 1,000 centipoise, preferably less than 400 centipoise. Generally, however, the total amount of solvent is used in an amount of 0 to 25 weight percent based upon the total weight of the Part I.

The free radical initiator (d), preferably used in the Part I component, is a peroxide and/or hydroperoxide. Examples include ketone peroxides, peroxy ester oxidizing agents, alkyl oxides, chlorates, perchlorates, and perbenzoates. Preferably, however, the oxidizing agent is a hydroperoxide or a mixture of peroxide and hydroperoxide. Hydroperoxides particularly preferred in the invention include t-butyl hydroperoxide, cumene hydroperoxide, paramenthane hydroperoxide, etc. The organic peroxides may be aromatic or alkyl peroxides. Examples of useful diacyl peroxides include benzoyl peroxide, lauroyl peroxide and decanoyl peroxide. Examples of alkyl peroxides include dicumyl peroxide and di-t-butyl peroxide.

The Part I may also contain an epoxy resin. For purposes of this disclosure, "epoxy resin" is defined as a thermosetting resin, which contains more than one reactive epoxide group per molecule. Such resins have either a mixed aliphatic-aromatic or exclusively non-aromatic (i.e., aliphatic or cycloaliphatic) molecular structure. The mixed aliphatic-aromatic epoxy resins generally are prepared by the well-known reaction of a bis-(hydroxy-aromatic)alkane or a tetrakis-(hydroxy-aromatic)alkane with a halogen-substituted aliphatic epoxide in the presence of a base such as, for example, sodium hydroxide or potassium hydroxide. Examples of the halogen-substituted aliphatic epoxides include epichlorohydrin, 4-chloro-1,2-epoxybutane, 5-bromo-1,2-epoxypentane, 6-chloro-1,3-epoxyhexane and the like. In general, it is preferred to use a chloride substitute terminal denoting that the epoxide group is on the end of the alkyl chain.

The most widely used epoxy resins are diglycidyl ethers of bisphenol A. These are made by reaction of epichlorohydrin with bisphenol A in the presence of an alkaline catalyst. By controlling the operating conditions and varying the ratio epichlorohydrin to bisphenol A, products of different molecular weight can be made. Other epoxy resins include (a) the diglycidyl ethers of other bisphenol compounds such as bisphenol B, F, G, and H, (b) epoxy resins produced by reacting a novolac resin with a halogen-substituted aliphatic epoxide such as epichlorohydrin, 4-chloro-1,2-epoxybutane, 5-bromo-1,2-epoxypentane, 6-chloro-1,3-epoxyhexane and the like, (c) epoxidized polybutadiene resins, and (d) epoxidized drying oils.

Particularly preferred are epoxy resins with a weight per epoxy group of 175 to 200. Although the viscosities of the epoxy resins are high, usually greater than 5,000 cps at 25° C., the epoxy component viscosity is reduced to a workable level when the epoxy resin is mixed with the oxidizing agent. Useful epoxy resins are disclosed in U.S. Pat. No. 4,518,723, which is hereby incorporated by reference into this disclosure.

Any organic polyisocyanate (b) can be used in the Part II component. Examples of organic polyisocyanate used include organic polyisocyanates having a functionality of two or more, preferably 2 to 5. It may be aliphatic, cycloaliphatic, aromatic, or a hybrid polyisocyanate, or mixtures. Representative examples of organic polyisocyanates are aliphatic polyisocyanates such as hexamethylene diisocyanate, alicyclic polyisocyanates such as 4,4'-dicyclohexylmethane diisocyanate, and aromatic polyisocyanates such as 2,4-diphenylmethane diisocyanate and 2,6-toluene diisocyanate, and dimethyl derivatives thereof. Other examples of suitable organic polyisocyanates are 1,5-naphthalene diisocyanate, triphenylmethane triisocyanate, xylylene diisocyanate, and the methyl derivatives thereof, polymethylenepolyphenyl isocyanates, chlorophenylene-2,4-diisocyanate, and the like. The organic polyisocyanate is used in a liquid form. Solid or viscous polyisocyanates must be used in the form of organic solvent solutions, the solvent generally being present in a range of up to 80 percent by weight of the solution.

Particularly preferred as the organic polyisocyanate are acrylated polyisocyanates. The acrylated polyisocyanates may be a "partially" or "totally" acrylated organic polyisocyanate". A totally acrylated organic polyisocyanate is an organic polyisocyanate wherein all of the isocyanato (NCO) groups of the organic polyisocyanate are reacted with a hydroxyl or carboxylic acid containing unsaturated acrylic monomer, acrylic polymer, or mixtures thereof. A partially acrylated organic polyisocyanate contains "free or unreacted" isocyanato groups. The term "acrylated organic polyisocyanate" includes mixtures of acrylated organic polyisocyanates and organic polyisocyanates, which are not acrylated and have free isocyanato groups (NCO groups).

The acrylated organic polyisocyanate must contain some free NCO, which is either found in the molecules of the partially acrylated organic polyisocyanate and/or in organic polyisocyanates having free NCO, which are mixed with the totally acrylated organic polyisocyanate. Although any acrylated organic polyisocyanate can be blended with an organic polyisocyanate, it is necessary to blend totally acrylated organic polyisocyanates with an organic polyisocyanate having free NCO, since the totally acrylated organic polyisocyanates do not have free NCO groups. Typically the amount of organic polyisocyanate blended with the acrylated organic polyisocyanate is from 0 to about 98 weight, based upon the combined weight of the acrylated organic polyisocyanate and the organic polyisocyanate blended with it, preferably from 2 to 98 weight percent. The acrylated polyisocyanate (which includes blends of acrylated organic polyisocyanates, whether they be totally or partially acrylated, and organic polyisocyanates which are not acrylated), typically contains at least 5 weight percent free NCO and typically no more than 31 weight percent free NCO, where the weight percent is based upon the weight of the acrylated isocyanate.

The acrylated organic polyisocyanate is prepared by reacting the organic polyisocyanate with typically from 2 to 49 weight percent, preferably from 2 to 30 weight percent, of a reactive unsaturated acrylic monomer or polymer having a free hydroxyl or free carboxylic acid functional group. The general procedure for preparing the acrylated organic polyisocyanate involves heating the acrylic monomer or polymer in the presence of the organic polyisocyanate until all of the hydroxy or carboxylic acid component has reacted.

Typical acrylic monomers that can be used as the reactive unsaturated acrylic monomer to prepare the acrylated organic polyisocyanates include hydroxyalkyl acrylates, carboxylic acid containing acrylates, alkoxyalkyl acrylates, hydroxyalkyl methacrylates, alkoxyalkyl methacrylates, N-alkoxymethylacrylamides, N-alkoxymethylmethacrylamides, and mixtures thereof. Preferably used as the monomers to modify the organic polyisocyanate are acrylic monomers selected from the group consisting of acrylic acid, methacrylic acid, substituted variations of acrylic acid or methacrylic acid, hydroxy ethyl acrylate, and hydroxy propyl acrylate.

Typical acrylic polymers that can be used as the reactive unsaturated polymer to prepare the acrylated organic polyisocyanates include epoxy acrylate reaction products, polyester/urethane/acrylate reaction products, acrylated urethane oligomers, polyether acrylates, polyester acrylates, acrylated epoxy resins, vinyl polyesters, vinyl esters, and dicylopentadiene resins.

The organic polyisocyanate used to prepare the partially acrylated organic polyisocyanate are the same as those described previously, i.e. aliphatic, cycloaliphatic, aromatic, or a hybrid polyisocyanate having a functionality of two or more, preferably 2 to 5.

The reactive unsaturated acrylic monomer, polymer, or mixture thereof (d), preferably used in the Part II component, contains ethylenically unsaturated bonds, but does not contain any free hydroxyl or carboxylic acid functional groups. Examples of such materials include a wide variety of monofunctional, difunctional, trifunctional, tetrafunctional and pentafunctional monomeric acrylates and methacrylates. A representative listing of these monomers includes alkyl acrylates, acrylated epoxy resins, cyanoalkyl acrylates, alkyl methacrylates, cyanoalkyl methacrylates, and difunctional monomeric acrylates. Other acrylates, which can be used, include trimethylolpropane triacrylate, methacrylic acid and 2-ethylhexyl methacrylate. Typical reactive unsaturated acrylic polymers, which may also be used include epoxy acrylate reaction products, polyester/urethane/acrylate reaction products, acrylated urethane oligomers, polyether acrylates, polyester acrylates, and acrylated epoxy resins.

Although solvents are not required for the Part II component, they may be used. Typical solvents used are generally polar solvents, such as liquid dialkyl esters, e.g. dialkyl phthalate of the type disclosed in U.S. Pat. No. 3,905,934, and other dialkyl esters such as dimethyl glutarate. Methyl esters of fatty acids, particularly rapeseed methyl ester, are also useful solvents. Suitable aromatic solvents are benzene, toluene, xylene, ethylbenzene, and mixtures thereof. Preferred aromatic solvents are mixed solvents that have an aromatic content of at least 90% and a boiling point range of 138° C. to 232° C. Suitable aliphatic solvents include kerosene.

Amounts of Components

Typically, the amount of the components used is from 2 to 50 weight percent of phenolic resole resin, preferably from 1 to 20 weight percent; 1 to 30 weight percent of free radical initiator, preferably from 2 to 20 weight percent; 10 to 70 weight percent of polyisocyanate, preferably from 20 to 50 weight percent; and 10 to 70 weight percent of multifunctional acrylate, preferably from 20 to 50 weight percent, where the weight percent is based upon the total weight of the binder system. The weight ratio of the Part I to Part II is from 5:95 to 60:40, preferably from 15:85 to 50:50.

Optional Components

Free radical scavengers or inhibitors such as benzoquinone can be added to the binder. Benzoquinone acts as a free radical inhibitor/scavenger to inhibit the free radical reactions that cause instability in the binder. The amount of benzoquinone used is generally from 0 to 3 weight percent, preferably 0 to 1 weight percent based upon the total weight of the binder. The benzoquinone may be incorporated into a solvent, which may be used in either the epoxy component (Part I) or the polyisocyanate component (Part I), or both. It is especially beneficial when used in the part containing the reactive unsaturated acrylic monomer or polymer.

It will be apparent to those skilled in the art that other additives such as silanes, silicones, benchlife extenders, release agents, defoamers, wetting agents, etc. can be added to the aggregate, or foundry mix. The particular additives chosen will depend upon the specific purposes of the formulator.

Aggregate

Various types of aggregate and amounts of binder are used to prepare foundry mixes by methods well known in the art. Ordinary shapes, shapes for precision casting, and refractory shapes can be prepared by using the binder systems and proper aggregate. The amount of binder and the type of aggregate used are known to those skilled in the art. The preferred aggregate employed for preparing foundry mixes is sand wherein at least about 70 weight percent, and preferably at least about 85 weight percent, of the sand is silica. Other suitable aggregate materials for ordinary foundry shapes include zircon, olivine, aluminosilicate, chromite sands, and the like.

In ordinary sand type foundry applications, the amount of binder is generally no greater than about 10% by weight and frequently within the range of about 0.5% to about 7% by weight based upon the weight of the aggregate. Most often, the binder content for ordinary sand foundry shapes ranges from about 0.6% to about 5% by weight based upon the weight of the aggregate in ordinary sand-type foundry shapes.

The foundry mix is molded into the desired shape and whereupon it is cured by the cold-box process. Curing by the cold-box process is carried out by contacting the foundry shape with a volatile tertiary amine as described in U.S. Pat. No. 3,409,579, which is hereby incorporated into this disclosure by reference. Examples of volatile tertiary amines, which can be used, include trimethylamine, dimethylethylamine, methyldiethylamine, triethylamine, dimethylethanolamine, and the like.

Abbreviations and Definitions

The following abbreviations are used in the Examples:

| | |
|---|---|
| AHS - | aromatic hydrocarbon solvent having a boiling point from about 175° C. to 200° C.. |
| CHP - | cumene hydroperoxide. |
| DEGDA - | diethylene glycol diacrylate. |
| EPOXY - | epoxy resin formed from the diglycidyl ether of bisphenol A. |
| HPA/MDI - | polyphenylene polymethylene organic polyisocyanate having a functionality of about 2 to 3 partially acrylated with 5 weight percent HPA. |
| PRC - | an 80:20 mixture of (a) a polybenzylic ether phenolic resin having a formaldehyde to phenol mole ratio of 1:2, prepared with ainc acetate dihydrate as the catalyst and modified with the addition of 0.09 mole of methanol per mole of phenol prepared along the lines described in the examples of U.S. Pat. No. 3,485,797, and (b) a dibasic ester solvent. |
| TMPTA - | trimethylolpropane triacrylate. |

EXAMPLES

The examples will illustrate specific embodiments of the invention. These examples along with the written description will enable one skilled in the art to practice the invention. It is contemplated that many other embodiments of the invention will work besides these specifically disclosed. All parts are by weight and all temperatures are in °C. unless otherwise specified. Controls or Comparative Examples are designated by letters.

Unless otherwise specified, the procedure used in the Examples to make test cores was to thoroughly mix 20 parts of the Part I component with sand, and then mix 80 parts of the Part II component with the mixture of sand and Part I. The binder level was 1.25 weight percent based on the weight of the sand (bos). The resulting foundry mix was blown into a core box, compacted, contacted with volatile triethylamine for about 1 second at a pressure of 20 psi, and purged with nitrogen at a pressure of about 18 psi for about 4 seconds to form cured AFS test cores (dogbone shaped). Total cycle time was about 20 seconds. This procedure is described in U.S. Pat. No. 3,409,579.

Tensile strengths of the test cores were measured at a variety of times according to AFS standard testing procedures. Measuring the tensile strength of the test cores enables one to predict how the mixture of sand and binder will work in actual foundry operations. In the Examples, the tensile strengths of the test cores were measured immediately (Imm), 5 minutes (5 min), one hour (1 hr), and 24 hours (24 hr) after curing. They were also measured 24 hours after being exposed to an environment having a relative humidity of 90% (90% RH).

Comparison A and Example 1

(Comparison of Binder Containing a Phenolic Resin and TMPTA with a Binder Containing an Epoxy Resin and TMPTA)

Two binders were prepared using the following formulations. Formulation A represents a comparison example. It contains an epoxy resin (Araldite GY2600) and is similar to that described in U.S. Pat. No. 5,880,175. The formulation of Example 1 contains phenolic resole resin used in conventional cold-box binder core-making process.

TABLE I (Binder formulations used)

| Part I | A | Example 1 |
| --- | --- | --- |
| CHP | 33 | 33 |
| AHS | 17 | 17 |
| EPOXY | 50 | — |
| PRC | — | 50 |

| Part II | Used for A and Example 1 |
| --- | --- |
| TMPTA | 123.3 |
| HPA/MDI74.7 | |

Parts A and B were mixed in a 20:80 ratio on Manley 1L5W lake sand at a level of 1.25% total binder on sand. The sand was blown at 60 psi in 0.5 seconds into tensile test tooling and then gassed with triethylamine at 20 psi for 1 second followed by an air purge at 20 psi for 6 seconds. After 24.5 seconds total cycle time the tooling was opened and the cured tensile specimens removed for testing.

Tensile results showed the following strengths are shown in Table II.

TABLE II (Tensile data for cores make with binders of A and Example 1)

| | Binder A | Binder of Example 1 |
| --- | --- | --- |
| Immediate (30 seconds) | 95 | 123 |
| 5 Minutes | 131 | 143 |
| 1 Hour | 137 | 128 |
| 24 Hour | 130 | 128 |

The data in Table II clearly show that the use of the binder containing the phenolic resin produced cores with improved immediate tensile strengths.

Comparison B and Example 2

(Comparison of Binder Containing a Phenolic Resin and DEGDA with a Binder Containing an Epoxy Resin and DEGDA)

Example 1 was repeated except DEGDA was substituted for TMPTA (hereinafter Binder 2). The tensile results are shown in Table III that follows:

TABLE III (Tensile data for cores make with binders of B and Example 2)

| | Binder B | Binder of Example 2 |
| --- | --- | --- |
| Immediate (30 seconds) | 103 | 170 |
| 5 Minutes | 169 | 189 |
| 1 Hour | 183 | 178 |
| 24 Hour | 168 | 164 |

The data in Table III clearly show that the use of the binder containing the phenolic resin produced cores with improved immediate tensile strengths.

Casting Tests

The erosion resistance of the binder was tested, according to a well-known method, using a 50-pound erosion wedge core. The shape of the erosion wedge was such that it had a longest side of 4" and the opposite side of side of the longest side was parallel to the longest side for 1". Then the opposite side of the longest side angled inward at a 60° angle until it connected to the opposite side of the side adjacent to the longest side (adjacent side). The adjacent side was 2¼" long and the opposite side of the adjacent side was parallel and 1" in length. The opposite side of the longest side and the opposite side of the adjacent side met 1' from the opposite side of the adjacent side.

The erosion wedge core was prepared by ramming the foundry mix into pattern to form the wedged-shaped core. Molten iron was poured through a pouring cup into a 1" diameter×16" height sprue located on top of the wedge-shaped core that was located on a sand vented reservoir. After the metal was poured, the wedge-shaped core was weighed to determine how much of the core eroded during the pouring of the metal. Cores with weaker binders erode more during this test as the molten metal impinges on the core. The result is that the castings are defective because they do not have the proper shape.

Standard erosion wedges were prepared with Class 30 Gray Iron at about 1480° C. using reclaimed sand at a 1.25% binder to sand ratio with no refractory coating. In one test, the reclaimed sand was mixed with Binder A. In the other test, the reclaimed sand was mixed with the binder of Example 1. The results are summarized in Table IV:

TABLE IV

CASTING TESTS RESULTS

| Binder | Erosion Resistance* |
| --- | --- |
| A | 4 |
| 1 | 3 |

*Casting Grade: 1 = Excellent, 2 = Good, 3 = Fair, 4 = Poor, 5 = Very Poor

The test indicates that improvements in castings result if a phenolic resin is used.

We claim:
1. A foundry binder system that cures in the presence of a volatile amine curing catalyst comprising:
   A. a Part I component consisting essentially of:
      (1) a phenolic resin component comprising a phenolic resole resin; and
      (2) an effective amount of a free radical initiator,
   B. a Part II component comprising:
      (i) from 5 to 70 weight percent of a reactive unsaturated acrylic monomer, acrylic polymer, and mixtures thereof; and

(2) from 10 to 70 weight percent of an organic polyisocyanate.

2. The binder system of claim 1 wherein the phenolic resole resin is a phenolic resole benzylic ether resin and is used in amount of 2 to 50 weight percent based upon the weight of the binder system.

3. The foundry binder system of claim 2 wherein the organic polyisocyanate is an acrylated organic polyisocyanate.

4. The foundry binder system of claim 3 wherein the weight ratio of the Part I to Part II is from 5:95 to 60:40.

5. The foundry binder system of claim 4 wherein the reactive unsaturated acrylic component is selected from the group consisting of diethylene glycol diacrylate, diethylene glycol dimethacrylate, and trimethyolpropane triacrylate.

6. A foundry mix comprising:
(a) a major amount of foundry aggregate; and
(b) an effective bonding amount of the foundry binder system of claim 1, 2, 3, 4, or 5.

7. A cold-box process for preparing a foundry shape comprising:
   A. introducing a foundry mix of claim 6 into a pattern to form an uncured foundry shape;
   B. curing the foundry mix in the pattern until it becomes self-supporting; and
   C. removing the foundry shape from the pattern.

8. A foundry shape prepared in accordance with claim 7.

9. A process of casting a metal article comprising:
   a. fabricating a shape in accordance with claim 7;
   b. pouring said metal while in the liquid state into said shape;
   c. allowing said metal to cool and solidify; and
   d. then separating the molded article.

10. A metal article prepared in accordance with claim 9.

* * * * *